United States Patent
Ahgren

(10) Patent No.: US 9,277,059 B2
(45) Date of Patent: *Mar. 1, 2016

(54) ECHO REMOVAL

(71) Applicant: Microsoft Technology Licensing, LLC, Redmond, WA (US)

(72) Inventor: Per Ahgren, Knivsta (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

This patent is subject to a terminal disclaimer.

(21) Appl. No.: 14/012,867

(22) Filed: Aug. 28, 2013

(65) Prior Publication Data

US 2014/0357325 A1    Dec. 4, 2014

(30) Foreign Application Priority Data

May 31, 2013   (GB) ..................................... 1309771

(51) Int. Cl.
  *H04B 3/20*   (2006.01)
  *H04M 9/08*   (2006.01)

(52) U.S. Cl.
  CPC ..................................... *H04M 9/082* (2013.01)

(58) Field of Classification Search
  USPC .............. 370/252, 286, 280, 281; 379/406.01
  See application file for complete search history.

(56) References Cited

U.S. PATENT DOCUMENTS

| | | |
|---|---|---|
| 3,787,645 A * | 1/1974 | Ochiai et al. ............. 379/406.11 |
| 4,977,591 A | 12/1990 | Chen et al. |
| 5,157,653 A | 10/1992 | Genter |
| 5,187,692 A | 2/1993 | Haneda et al. |
| 5,305,307 A | 4/1994 | Chu |
| 5,559,881 A | 9/1996 | Sih |

(Continued)

FOREIGN PATENT DOCUMENTS

| | | |
|---|---|---|
| EP | 1978649 | 10/2008 |
| WO | WO-2011133075 | 10/2011 |

(Continued)

OTHER PUBLICATIONS

Bendersky, et al., "Nonlinear Residual Acoustic Echo Suppression for High Levels of Harmonic Distortion", In International Conference on Acoustics, Speech and Signal Processing, Retrieved from <tp://research.microsoft.com/pubs/69504/diegobenderskyhdres.pdf>,(Apr. 2008), 4 pages.

(Continued)

*Primary Examiner* — Duc C Ho
(74) *Attorney, Agent, or Firm* — Danielle Johnston-Holmes; Micky Minhas

(57) ABSTRACT

Echo removal techniques are described. As part of the echo removal, a first model estimate of the echo in the received audio signal is determined using a first model and a second model estimate of the echo is determined using a second model. A first accuracy value of the first model is determined according to a model accuracy measure, and a second accuracy value of the second model is determined according to the model accuracy measure. It is then determined if the first model is more accurate than the second model based on a comparison of the first accuracy value and the second accuracy value and the second model is selectively updated based on said comparison. Echo removal is applied to the received audio signal using only the second model estimate of the echo.

20 Claims, 4 Drawing Sheets

(56) References Cited

U.S. PATENT DOCUMENTS

| | | | |
|---|---|---|---|
| 5,796,819 | A | 8/1998 | Romesburg |
| 5,822,275 | A | 10/1998 | Michalski |
| 5,852,661 | A | 12/1998 | Chen |
| 5,995,620 | A | 11/1999 | Wigren |
| 6,415,029 | B1 * | 7/2002 | Piket et al. ............... 379/406.04 |
| 6,507,652 | B1 | 1/2003 | Laberteaux |
| 6,606,382 | B2 | 8/2003 | Gupta |
| 6,836,547 | B2 | 12/2004 | Tahernezhaadi |
| 6,944,289 | B2 | 9/2005 | Tahernezhaadi et al. |
| 6,990,195 | B1 | 1/2006 | Leblanc et al. |
| 7,003,099 | B1 | 2/2006 | Zhang et al. |
| 7,054,437 | B2 | 5/2006 | Enzner |
| 7,054,451 | B2 | 5/2006 | Janse et al. |
| 7,388,954 | B2 | 6/2008 | Pessoa et al. |
| 7,433,463 | B2 | 10/2008 | Alves et al. |
| 7,684,559 | B2 | 3/2010 | Hoshuyama |
| 7,773,743 | B2 | 8/2010 | Stokes et al. |
| 7,860,235 | B2 | 12/2010 | Sudo et al. |
| 2002/0054685 | A1 | 5/2002 | Avendano et al. |
| 2003/0123674 | A1 | 7/2003 | Boland |
| 2003/0185402 | A1 | 10/2003 | Benesty et al. |
| 2004/0071207 | A1 | 4/2004 | Skidmore et al. |
| 2004/0161101 | A1 | 8/2004 | Yiu et al. |
| 2006/0018460 | A1 | 1/2006 | McCree |
| 2006/0147032 | A1 | 7/2006 | McCree et al. |
| 2010/0208908 | A1 | 8/2010 | Hoshuyama |
| 2010/0215185 | A1 | 8/2010 | Christoph |
| 2010/0246804 | A1 | 9/2010 | Prakash et al. |
| 2010/0303228 | A1 | 12/2010 | Zeng et al. |
| 2011/0081026 | A1 | 4/2011 | Ramakrishnan et al. |
| 2011/0158363 | A1 | 6/2011 | Andersen et al. |
| 2011/0261949 | A1 | 10/2011 | Dyba et al. |
| 2012/0250872 | A1 | 10/2012 | Leblanc et al. |
| 2012/0290525 | A1 | 11/2012 | Malik et al. |
| 2014/0357323 | A1 | 12/2014 | Ahgren |
| 2014/0357324 | A1 | 12/2014 | Ahgren |
| 2014/0357326 | A1 | 12/2014 | Ahgren |

FOREIGN PATENT DOCUMENTS

| | | |
|---|---|---|
| WO | WO-2012109385 | 8/2012 |
| WO | WO-2012166092 | 12/2012 |

OTHER PUBLICATIONS

Gansler, et al., "Double-Talk Robust Fast Converging Algorithms for Network Echo Cancellation", *In IEEE Transactions on Speech and Audio Processing*, vol. 8, Issue 6, Retrieved from <http://externe.emt.inrs.ca/users/benesty/papers/sap_nov2000.pdf>,(Nov. 2000), 8 pages.

Gupta, et al., "Nonlinear Acoustic Echo Control Using an Accelerometer", *In Proceedings of the IEEE International Conference on Acoustics, Speech and Signal Processing*, Retrieved from <http://enpub.fulton.asu.edu/sensip/SenSIP_Papers/Non_linear_echo_cancellation.pdf>,(Apr. 19, 2009), 4 pages.

Hoshuyama, et al., "An Acoustic Echo Suppressor Based on a Frequency-Domain Model of Highly Nonlinear Residual Echo", *In IEEE International Conference on Acoustics, Speech and Signal Processing*, Retrieved from <http://ieeexplore.ieee.org/stamp/stamp.jsp?tp=&arnumber=1661264>, (May 14, 2006), 4 pages.

Stenger, et al., "Nonlinear Acoustic Echo Cancellation with 2nd Order Adaptive Volterra Filters", *In Proceedings of IEEE International Conference on Acoustics, Speech and Signal Processing*, Retrieved from <http://ieeexplore.ieee.org/xpls/abs_all.jsp?arnumber=759811>,(Mar. 15, 1999), 4 pages.

Ghose, et al., "A Double-talk Detector for Acoustic Echo Cancellation Applications", Retrieved at <<http://citeseerx.ist.psu.edu/viewdoc/download?doi=10.1.1.59.800&rep=rep1&type=pdf>>, In Journal of Signal Processing, vol. 80, Issue 8, Aug. 2000, pp. 9.

"Nonlinear Acoustic Echo Cancellation", Retrieved at <<http://www.Ims.Int.de/research/activity/audio/sign/nlaec/>>, Retrieved Date: Jan. 21, 2013, pp. 3.

Breining, et al., "Acoustic Echo Control—An Application of Very-High-Order Adaptive Filters", Retrieved at <<http://ieeexplore.ieee.org/stamp/stamp.jsp?tp=&arnumber=774933, In IEEE Signal Processing Magazine, Jul. 1999, pp. 28.

"SEA2M™ Speech Enhancement Algorithms for Array of Microphones", Retrieved at <<http://www.rt-rk.com/white_papers/rt-rk_wp_sea2m.pdf, In White Paper of NIIT MICRONAS, Nov. 2006, pp. 33.

Dyba, et al., "Network Echo Cancellers and Freescale Solutions Using the StarCore™ SC140 Core", Retrieved at http://cache.freescale.com/files/dsp/doc/app_note/AN2598.pdf, Nov. 2004, pp. 48.

"International Search Report and Written Opinion", Application No. PCT/US2014/039871, Aug. 29, 2014, 10 pages.

"International Search Report and Written Opinion", Application No. PCT/US2014/039873, Sep. 1, 2014, 10 pages.

"International Search Report and Written Opinion", Application No. PCT/US2014/039869, Aug. 26, 2014, 9 pages.

"International Search Report and Written Opinion", Application No. PCT/US2014/039872, Sep. 8, 2014, 9 pages.

Azpicueta-Ruiz, et al., "Novel Schemes for Nonlinear Acoustic Echo Cancellation Based on Filter Combinations", 2009 IEEE, Apr. 19, 2009, pp. 193-196.

"Ex Parte Quayle Action", U.S. Appl. No. 14/015,998, Mar. 13, 2015, 6 pages.

"International Preliminary Report on Patentability", Application No. PCT/US2014/039871, Jul. 20, 2015, 6 pages.

"Notice of Allowance", U.S. Appl. No. 14/015,998, Jun. 4, 2015, 4 pages.

"Notice of Allowance", U.S. Appl. No. 14/015,998, Aug. 27, 2015, 2 pages.

"Second Written Opinion", Application No. PCT/US2014/039869, May 6, 2015, 4 pages.

"Second Written Opinion", Application No. PCT/US2014/039871, May 7, 2015, 4 pages.

"International Preliminary Report on Patentability", Application No. PCT/US2014/039869, Sep. 9, 2015, 11 pages.

"International Preliminary Report on Patentability", Application No. PCT/US2014/039872, Sep. 9, 2015, 11 pages.

"Second Written Opinion", Application No. PCT/US2014/039873, May 7, 2015, 5 pages.

"International Preliminary Report on Patentability", Application No. PCT/US2014/039873, Sep. 4, 2015, 6 pages.

"Supplemental Notice of Allowance", U.S. Appl. No. 14/015,998, Sep. 30, 2015, 2 pages.

* cited by examiner

ECHO REMOVAL

RELATED APPLICATION

This application claims priority under 35 USC 119 or 365 to Great Britain Application No. 1309771.2 filed May 31, 2013, the disclosure of which is incorporate in its entirety.

BACKGROUND

A device may have audio input apparatus that can be used to receive audio signals from the surrounding environment. The device may also have audio output apparatus that can be used to output audio signals to the surrounding environment. For example, a device may have one or more speakers for outputting audio signals and one or more microphones for receiving audio signals. Audio signals which are output from the speaker(s) of the device may be received as "echo" in the audio signal received by the microphone(s). It may be the case that this echo is not desired in the received audio signal. For example, the device may be a user device (such as a mobile phone, tablet, laptop, PC, etc) which is used in a communication event, such as an audio or video call, with another user device over a network. Far-end signals of the call may be output from the speaker at the user device and may be received as echo in the audio signals received by the microphone at the device. Such echo can be disturbing to users of the call, and the perceived quality of the call may be reduced due to the echo. In particular, the echo may cause interference for near-end audio signals which are intended to be received by the microphone and transmitted to the far-end in the call. Therefore echo cancellation and/or echo suppression may be applied to the received audio signals to thereby suppress the echo in the received audio signal. The power of the echo in the received audio signal may vary depending upon the arrangement of the user device. For example, the user device may be a mobile phone and in that case, the power of the echo in the received audio signal would normally be higher when the mobile phone is operating in a "hands-free" mode compared to when the mobile phone is not operating in a "hands-free" mode.

Echo cancellation (or "echo subtraction") techniques aim to estimate an echo signal included in the audio signal received at the microphone, based on knowledge of the audio signal which is output from the speaker. The estimate of the echo signal can then be subtracted from the received audio signal thereby removing at least some of the echo from the received audio signal. Echo suppression is used to apply frequency-dependent suppression to the received audio signal to thereby suppress the echo in the received audio signal.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of removing echo in a received audio signal. As part of the echo removal, a first model estimate of the echo in the received audio signal is determined using a first model and a second model estimate of the echo in the received audio signal is determined using a second model. A first accuracy value of the first model is determined according to a model accuracy measure, and a second accuracy value of the second model is determined according to the model accuracy measure. It is then determined if the first model is more accurate than the second model based on a comparison of the first accuracy value and the second accuracy value and the second model is selectively updated based on said comparison. Echo removal is applied to the received audio signal using only the second model estimate of the echo.

The method may be used in a call (e.g. a call implementing voice over internet protocol (VoIP) to transmit audio data between user devices) in which case the outputted audio signal may be a far-end signal received from the far-end of the call, and the received signal includes the resulting echo and a near-end signal for transmission to the far-end of the call.

BRIEF DESCRIPTION OF THE DRAWINGS

For a better understanding of the described embodiments and to show how the same may be put into effect, reference will now be made, by way of example, to the following drawings in which.

DETAILED DESCRIPTION

Embodiments will now be described by way of example only.

Figure 1:
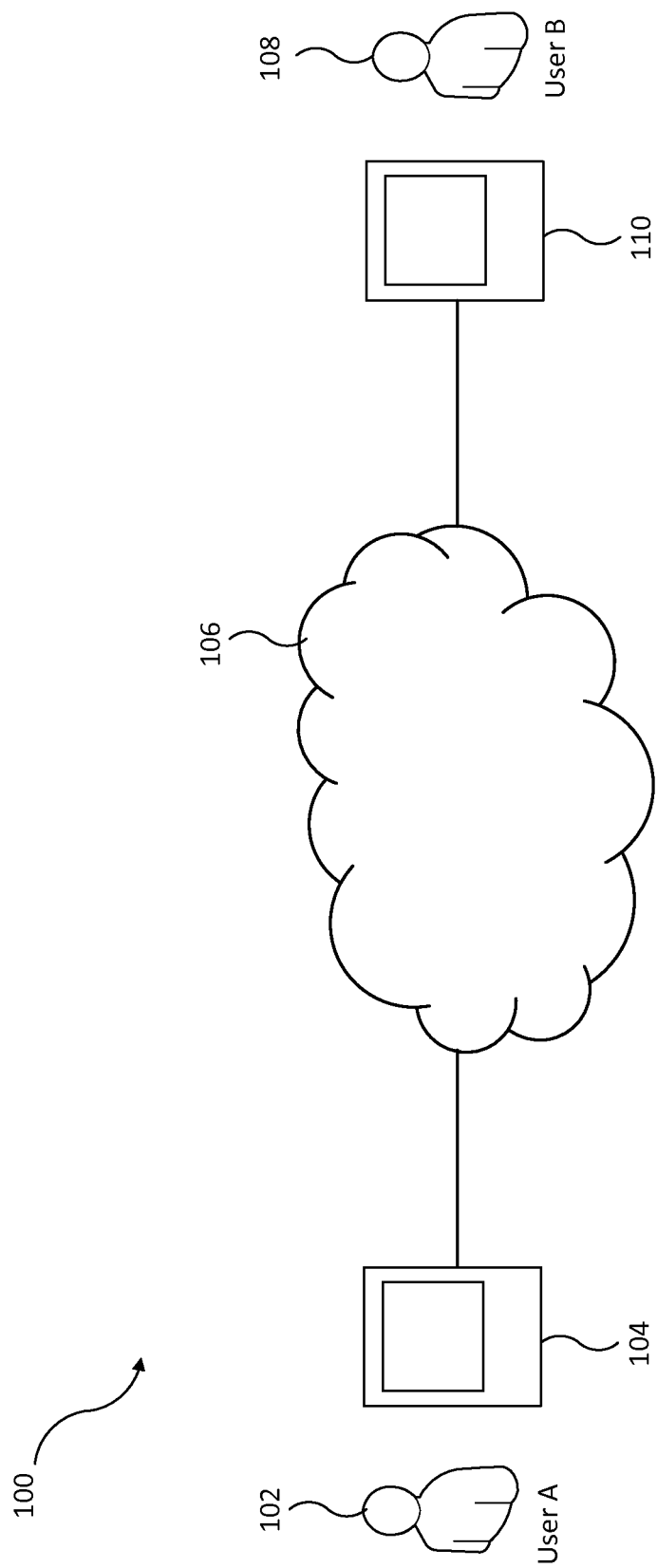
FIG. 1 shows a schematic illustration of a communication system.

FIG. 1 shows a communication system 100 comprising a first user 102 ("User A") who is associated with a first user device 104 and a second user 108 ("User B") who is associated with a second user device 110. In other embodiments the communication system 100 may comprise any number of users and associated user devices. The user devices 104 and 110 can communicate over the network 106 in the communication system 100, thereby allowing the users 102 and 108 to communicate with each other over the network 106. The communication system 100 shown in FIG. 1 is a packet-based communication system, but other types of communication system could be used. The network 106 may, for example, be the Internet. Each of the user devices 104 and 110 may be, for example, a mobile phone, a tablet, a laptop, a personal computer ("PC") (including, for example, Windows™, Mac OS™ and Linux™ PCs), a gaming device, a television, a personal digital assistant ("PDA") or other embedded device able to connect to the network 106. The user device 104 is arranged to receive information from and output information to the user 102 of the user device 104. The user device 104 comprises output means such as a display and speakers. The user device 104 also comprises input means such as a keypad, a touch-screen, a microphone for receiving audio signals and/or a camera for capturing images of a video signal. The user device 104 is connected to the network 106.

The user device 104 executes an instance of a communication client, provided by a software provider associated with the communication system 100. The communication client is a software program executed on a local processor in the user device 104. The client performs the processing required at the user device 104 in order for the user device 104 to transmit and receive data over the communication system 100.

The user device 110 corresponds to the user device 104 and executes, on a local processor, a communication client which corresponds to the communication client executed at the user device 104. The client at the user device 110 performs the processing required to allow the user 108 to communicate over the network 106 in the same way that the client at the user device 104 performs the processing required to allow the user 102 to communicate over the network 106. The user devices 104 and 110 are endpoints in the communication system 100. FIG. 1 shows only two users (102 and 108) and two user devices (104 and 110) for clarity, but many more users and user devices may be included in the communication system 100, and may communicate over the communication system 100 using respective communication clients executed on the respective user devices.

Figure 2:
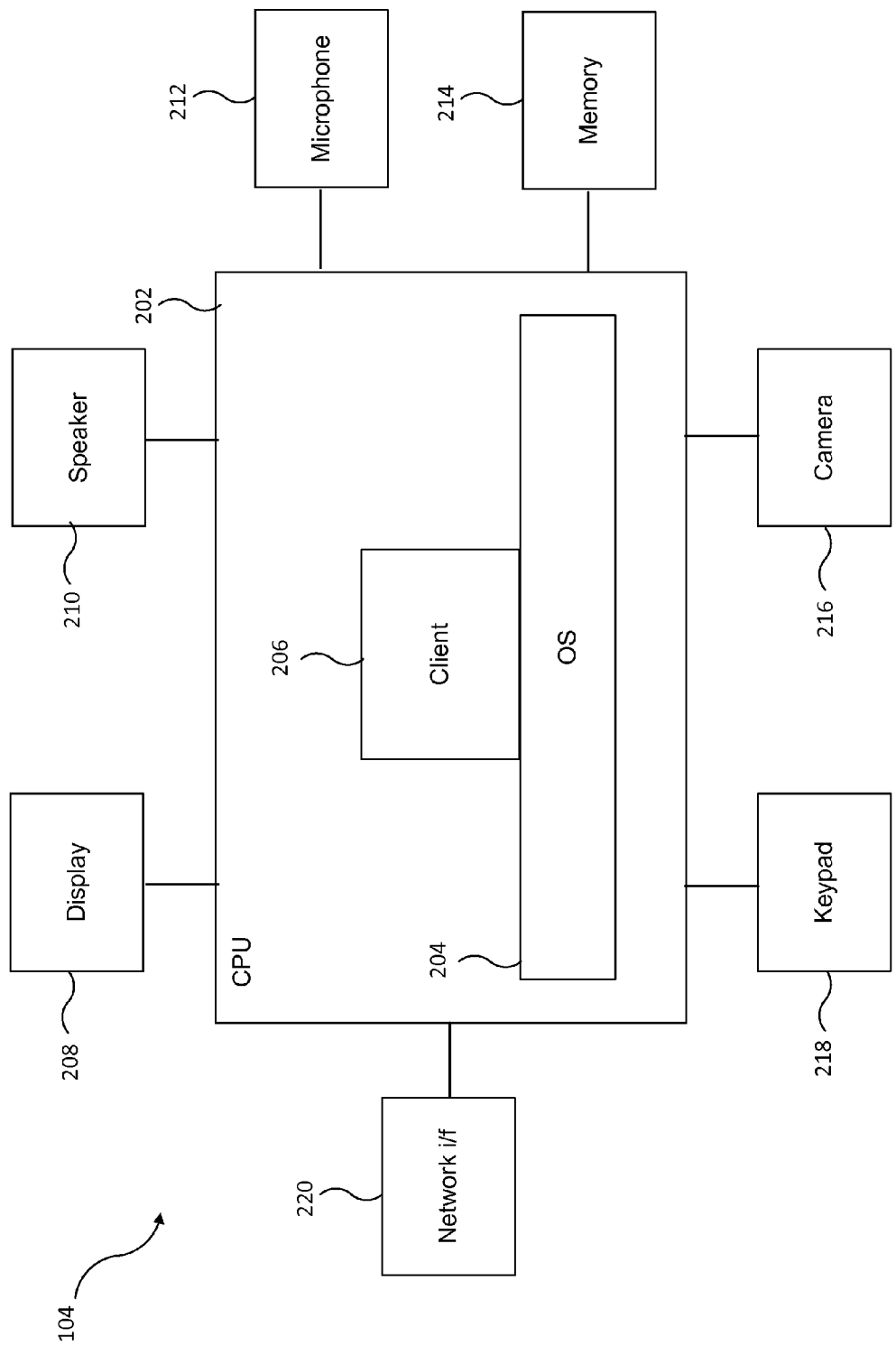
FIG. 2 is a schematic block diagram of a user device.

FIG. 2 illustrates a detailed view of the user device 104 on which is executed a communication client instance 206 for communicating over the communication system 100. The user device 104 comprises a central processing unit ("CPU") or "processing module" 202, to which is connected: output devices such as a display 208, which may be implemented as a touch-screen, and a speaker (or "loudspeaker") 210 for outputting audio signals; input devices such as a microphone 212 for receiving audio signals, a camera 216 for receiving image data, and a keypad 218; a memory 214 for storing data; and a network interface 220 such as a modem for communication with the network 106. The user device 104 may comprise other elements than those shown in FIG. 2. The display 208, speaker 210, microphone 212, memory 214, camera 216, keypad 218 and network interface 220 may be integrated into the user device 104 as shown in FIG. 2. In alternative user devices one or more of the display 208, speaker 210, microphone 212, memory 214, camera 216, keypad 218 and network interface 220 may not be integrated into the user device 104 and may be connected to the CPU 202 via respective interfaces. One example of such an interface is a USB interface. If the connection of the user device 104 to the network 106 via the network interface 220 is a wireless connection then the network interface 220 may include an antenna for wirelessly transmitting signals to the network 106 and wirelessly receiving signals from the network 106.

FIG. 2 also illustrates an operating system ("OS") 204 executed on the CPU 202. Running on top of the OS 204 is the software of the client instance 206 of the communication system 100. The operating system 204 manages the hardware resources of the computer and handles data being transmitted to and from the network 106 via the network interface 220. The client 206 communicates with the operating system 204 and manages the connections over the communication system. The client 206 has a client user interface which is used to present information to the user 102 and to receive information from the user 102. In this way, the client 206 performs the processing required to allow the user 102 to communicate over the communication system 100.

In acoustic echo cancellation the aim is to remove the echo signal s(t) in the microphone signal y(t) originating from the loudspeaker signal x(t). This should be done as exactly as possible and as non-obtrusively as possible in order to have as little impact as possible on the perception of any near-end signal v(t). The microphone signal can be written as y(t)= s(t)+v(t). The echo signal is a function of the loudspeaker signal as s(t)=F(x(t)).

There are two main ways to achieve the above, one being echo subtraction and the other being echo suppression. Often these two approaches are combined.

In both echo suppression and echo subtraction, a model $\hat{F}(x(t))$ is used to estimate the echo, or some properties of the echo such as the echo power, in the microphone signal. A common problem in the estimation of such models is that careful control of the model estimation is needed so that the update speed of the model estimation is adjusted to the signal conditions at hand. An example is that if the model is adjusted when both the echo signal s(t) and near-end signal v(t) are strong, the model will often diverge in the sense that it will be a poor estimator of the echo.

There are some known techniques to deal with this problem, one being called doubletalk detection and another being denoted step-size control. In doubletalk detection, when both a strong echo s(t) and near-end signal v(t) is detected the model adaptation is typically temporarily stopped during the duration of the doubletalk. The problem with doubletalk detection algorithms is that it in general it is difficult to achieve in as precise manner as is needed to ensure good model estimates, and that for its operation, it typically involves using the actual model estimate which it is designed to control. In step-size control, the updating speed is carefully adjusted depending on the accuracy of the model and on the powers of the near-end signal v(t) and echo signal s(t) in order to achieve the updating of the model. The main problem with step-size control algorithms is that it is very difficult to accurately assess the accuracy of the model which is needed to select the accurate update speed.

In embodiments described below, the need for doubletalk detection and step-size control is avoided by using two models, a first model that is always updated regardless of the conditions, and a second model that is updated based on the first model whenever the first model is deemed better (more accurate) than the second model.

Figure 3:
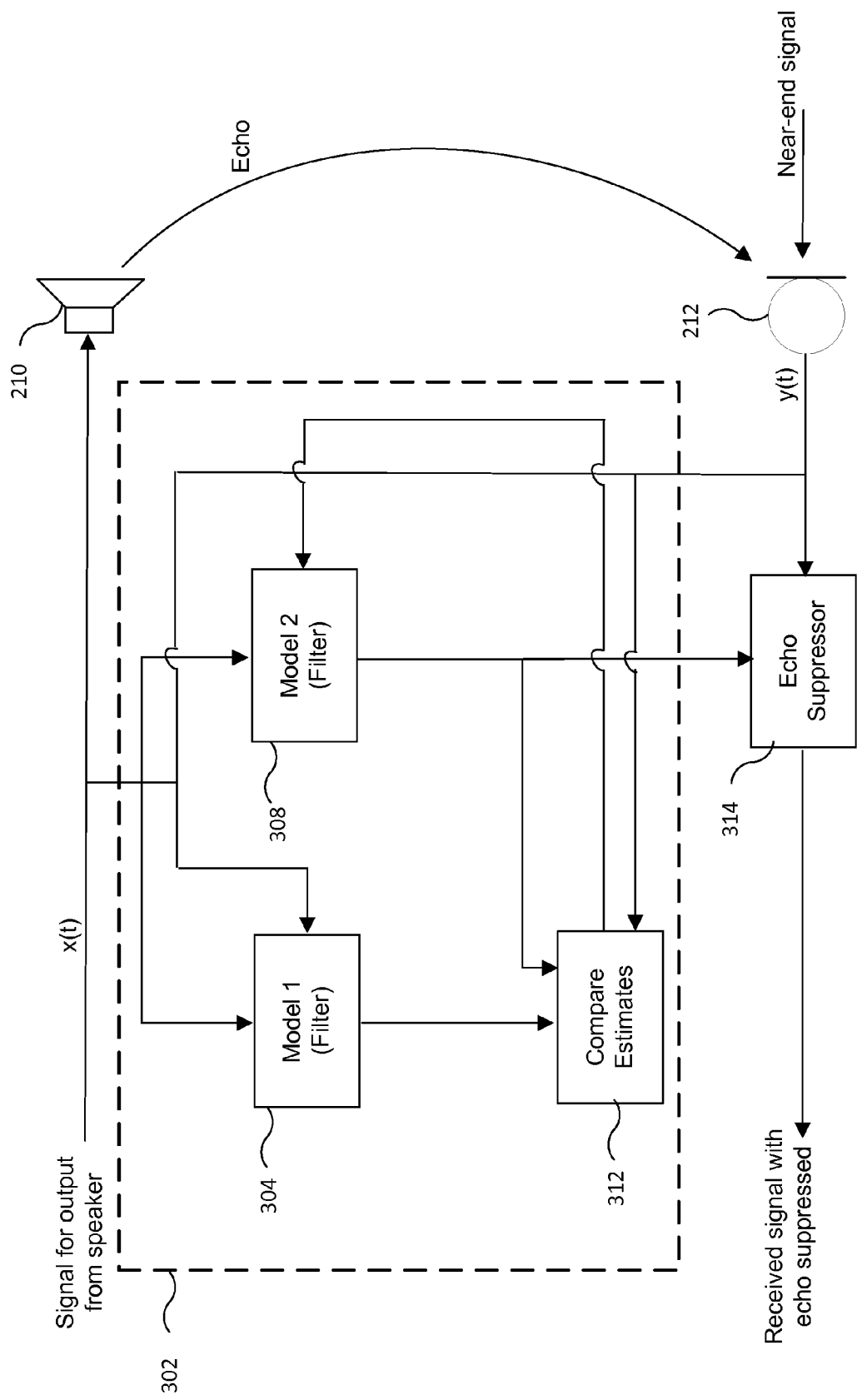
FIG. 3 is a functional diagram showing modules of a user device for use in echo removal.
Figure 4:
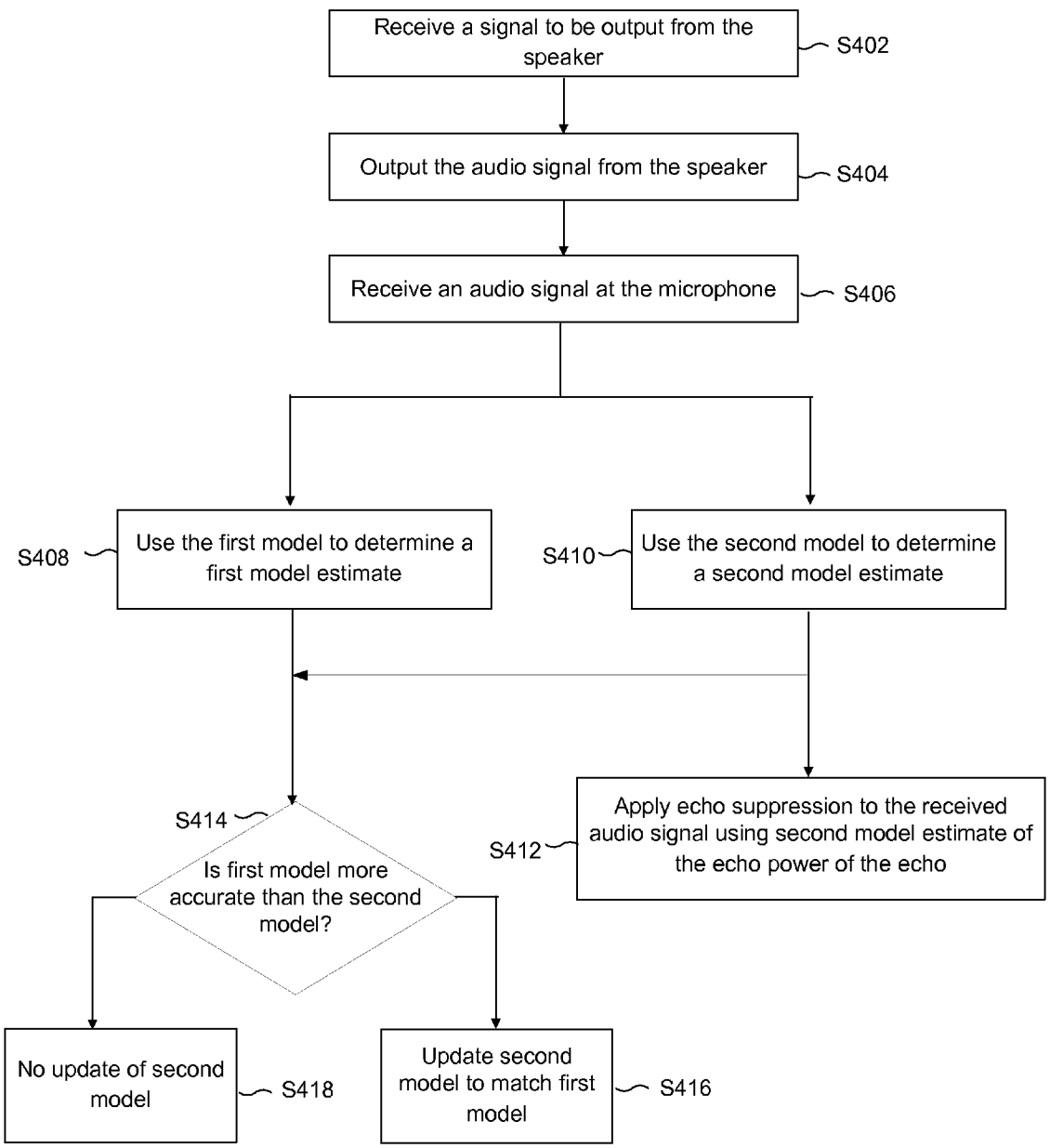
FIG. 4 is a flow chart for a process of removing echo.

With reference to FIGS. 3 and 4 there is now described a method of removing echo. FIG. 3 is a functional diagram of a part of the user device 104 showing how an echo removal process is implemented.

As shown in FIG. 3, the user device 104 comprises the speaker 210, the microphone 212, a modelling module 302, and an echo removal module 314. The modelling module 302 comprises a first filter module 304, a second filter module 308, and a comparison module 312. The echo removal module 314 is described with reference to FIG. 3 as an echo suppression module 314.

FIG. 4 is a flow chart for the process of suppressing echo.

A signal x(t) to be output from the speaker 210 is coupled to an input of the speaker 210. It should be noted that in the embodiments described herein there is just one speaker (indicated by reference numeral 210 in the figures) but in other embodiments there may be more than one speaker to which the signal to be outputted is coupled (for outputting therefrom). Similarly, in the embodiments described herein there is just one microphone (indicated by reference numeral 212 in the figures) but in other embodiments there may be more than one microphone which receive audio signals from the surrounding environment. The signal to be output from the speaker 210 is also coupled to the modelling module 302. In particular, the signal to be output from the speaker 210 is coupled to a first input of the first filter module 304 and to a first input of the second filter module 308. An output of the microphone 212 is coupled to the modelling module 302. In particular, the output of the microphone 212 is coupled to a second input of the first filter module 304 and to a first input of the comparison module 312. The output of the microphone 212 is also coupled to a first input of the echo suppression module 314. An output of the first filter module 304 is coupled to a second input of the comparison module 312. An output of the second filter module 308 is coupled to a third input of the comparison module 312. An output of the comparison module 312 is coupled to a second input of the second filter module 308. An output of the modelling module 302 is coupled to a second input of the echo suppression module 314. In particular the output of the second filter module 308 is coupled to the second input of the echo suppression module 314. An output of the echo suppression module 314 is used to provide the received signal (with echo suppression having been applied) for further processing in the user device 104.

In step S402 a signal is received which is to be outputted from the speaker 210. For example, the signal to be outputted may be a far-end signal that has been received at the user device 104 from the user device 110 during a call between the users 102 and 108 over the communication system 100. Any processing that is required to be performed on the received signal (e.g. decoding using a speech codec, depacketizing, etc) is performed as is known in the art (e.g. by the client 206) to arrive at the signal x(t) which is suitable to be outputted from the speaker 210. The signal x(t) is a digital signal. At least some of the processing of the signal in the user device 104 prior to outputting the signal from the speaker 210 is performed in the digital domain. As is known in the art, a digital to analogue converter (DAC) is applied to the digital signal x(t) before playout from the loudspeaker 210. Similarly, an analogue to digital converter (ADC) is applied to the signal captured by the microphone 212 to arrive at the digital signal y(t).

In other embodiments, the signal to be outputted may be received from somewhere other than over the communication system 100 in a call. For example, the signal to be outputted may have been stored in the memory 214 and step S402 may comprise retrieving the signal from the memory 214.

In step S404 the audio signal x(t) is outputted from the speaker 210. In this way the audio signal x(t) is outputted to the user 102.

In step S406 the microphone 212 receives an audio signal. As shown in FIG. 3 the received audio signal may include a near-end signal which is a desired signal or "primary signal". The near-end signal is the signal that the user 102 intends the microphone 212 to receive. However, the received audio signal also includes an echo signal resulting from the audio signals outputted from the speaker 210 in step S404. The received audio signal may also include noise, such as background noise. Therefore, the total received audio signal y(t) can be given by the sum of the near-end signal, the echo and the noise. The echo and the noise act as interferences for the near-end signal.

The first filter module 304 takes as inputs the outputted audio signal x(t) and the received audio signal y(t). In step S408, the first filter module 304 is used to model the echo in the received audio signal y(t). In particular, the first filter module 304 is operable to determine an estimate of the echo component in the near end signal y(t) using the outputted audio signal x(t) and the received audio signal y(t).

The echo path describes the effects of the acoustic paths travelled by the far end signal from the speaker 210 to the microphone 212. The far end signal may travel directly from the speaker 210 to the microphone 212, or it may be reflected from various surfaces in the environment of the near end terminal. The echo path traversed by the far end signal output from the speaker 210 may be regarded as a system having a frequency and a phase response which may vary over time.

In order to remove the acoustic echo s(t) from the signal y(t) recorded at the near-end microphone 212 it is necessary to estimate how the echo path changes the desired far-end speaker output signal x(t) to an undesired echo component in the input signal.

The echo path h(t) describes how the echo in the received audio signal y(t) relates to the audio signal x(t) output from the speaker 210, e.g. for a linear echo path represented by the impulse response h(t) according to the equation: $s(t)=\sum_{n=0}^{N_{true}} h_n(t)x(t-n)$, where s(t) is the echo in the received audio signal y(t), $N_{true}$ is a sufficiently large number to cover the non-negligible parts of the impulse response (theoretically $N_{true}$ is infinite), and $h_n(t)$ are the coefficients of the impulse response describing the echo path h(t). The echo path h(t) may vary in both time and frequency and may be referred to herein as h(t) or h(t,f). The echo path h(t) may depend upon (i) the current environmental conditions surrounding the speaker 210 and the microphone 212 (e.g. whether there are any physical obstructions to the passage of the audio signal from the speaker 210 to the microphone 212, the air pressure, temperature, wind, etc), and (ii) characteristics of the speaker 210 and/or the microphone 212 which may alter the signal as it is outputted and/or received.

The first filter module 304 models the echo path h(t) of the echo in the received audio signal y(t) by determining a weighted sum of the current and a finite number (N) of previous values of the outputted audio signal x(t). The first filter module 304 therefore implements an Nth order filter which has a finite length (in time) over which it considers the values of the outputted audio signal x(t) in determining the estimate of the echo path $\hat{h}(t)$. In this way, the first filter module 304 dynamically adapts the filter estimate of the echo path $\hat{h}(t)$. The operation is described by the following equation, which defines the echo in the received audio signal y(t) in terms of the outputted audio signal x(t): $\hat{s}_1(t)=\sum_{n=0}^{N} \hat{h}_n(t)x(t-n)$. Therefore N+1 samples of the outputted audio signal x(t) are used, with a respective N+1 weights $\hat{h}_n(t)$. The set of N+1 weights $\hat{h}_n(t)$ is referred to herein simply as the estimate of the echo path $\hat{h}(t)$. In other words the estimate of the echo path $\hat{h}(t)$ is a vector having N+1 values where the first filter module 304 implements an Nth order filter, taking N+1 values (e.g. N+1 frames) of the signal x(t) into account.

It can be appreciated that it is easier to adapt the filter estimate of the echo path $\hat{h}(t)$ when the echo is a dominant part of the received audio signal, that is when y(t)≅s(t). However, it may be possible to adapt the filter estimate of the echo path $\hat{h}(t)$ even when the echo is not a dominant part of the received audio signal y(t) if the echo s(t) is independent of the other signal components of y(t).

It will be appreciated by one skilled in the art that the estimate of the echo path $\hat{h}(t)$ does not need to be explicitly calculated, but could be represented by means of filter coefficients obtained from stochastic gradient algorithms such as Least Mean Squares (LMS), Normalized Least Mean Squares (NLMS), Fast Affine Projection (FAP) and Recursive Least Squares (RLS).

The estimate of the echo path $\hat{h}(t)$ is used to provide filter coefficients that filter the far end signal x(t) to generate an estimate $\hat{s}_1(t)$ of the echo component in the near end signal y(t) in accordance with the estimate of the echo path $\hat{h}(t)$. Regardless of the particular algorithm used, the filter coefficients of the first filter module 304 are updated with each iteration of the algorithm, thus the coefficients of the first filter module 304 are continually updated over time regardless of the signal conditions at hand.

Whilst the above description refers to the use of a time domain FIR model of the echo path to estimate the echo component in the near end signal y(t) it will be appreciated by those skilled in the art that this is just an example and not limiting in any way. That is, the first filter module 304 may operate to determine an estimate of the echo path $\hat{h}(t)$ and thus an estimate $\hat{s}_1(t)$ of the echo component in the near end signal y(t) in the time domain or in the frequency domain.

Preferably, the estimate of the echo component is passed from the first filter module 304 to the comparison module 312 (as shown in FIG. 3).

In other embodiments, in step S408 the estimate of the echo component is passed from the first filter module 304 to a first power estimating module (not shown in FIG. 3). The first power estimating module estimates the echo power in the received audio signal based on the filter estimate (determined by the first filter module 304) and the far end signal x(t). There are many ways to do this that are known to persons skilled in the art and the scope of this disclosure is not limited to any particular method of determining an echo power estimate. The first power estimating module is arranged to output its corresponding echo power estimate to the comparison module 312.

The second filter module 308 takes as inputs the outputted audio signal x(t) and a signal from the comparison module 312. In step S410, the second filter module 308 is used to model the echo in the received audio signal y(t). In particular, the second filter module 308 is operable to determine a second model estimate of the echo component in the near end signal y(t) using the outputted audio signal x(t). As the second filter module 308 does not receive the near end signal y(t), the second filter module 308 is initialized with a set of filter coefficients in order for it to output an estimate of the echo component s(t). Techniques for initializing filter coefficients are well known to those skilled in the art and are therefore not described herein.

In contrast to the first filter module 304, the second filter module 308 does not receive, as an input, the received audio signal y(t). Thus, the second filter module 308 does not operate to estimate the echo path $\hat{h}(t)$ to provide filter coefficients that filter the far end signal x(t). Instead, the second filter module 308 relies on receiving a signal from the comparison module 312 in order to update its filter coefficients. The filter coefficients of the second filter module 308 are updated in an irregular manner as will be described in more detail below. The filter coefficients of the second filter module 308 filter the far end signal x(t) to generate an estimate of the echo component in the near end signal y(t).

Preferably, the estimate of the echo component output from the second filter module 308 is passed from the second filter module 308 to both the comparison module 312 and the echo suppressor 314 (as shown in FIG. 3).

In other embodiments, in step S410 the estimate of the echo component output from the second filter module 308 is supplied to a second power estimating module (not shown in FIG. 3). The second power estimating module estimates the echo power in the received audio signal based on the filter estimate (determined by the second filter module 308) and the far end signal x(t). The second power estimating module outputs its corresponding echo power estimate to both the comparison module 312 and the echo suppressor 314.

The comparison module 312 takes as inputs a first estimate $\hat{s}_1(t)$ and a second estimate $\hat{s}_2(t)$. The first estimate $\hat{s}_1(t)$ may be an estimate of the echo component output from the first filter module 304 or an echo power estimate output from the first power estimating module. Similarly, the second estimate $\hat{s}_2(t)$ may be an estimate of the echo component output from the second filter module 308 or an echo power estimate output from the second power estimating module. The comparison module 312 also takes as an input the received audio signal y(t) or a signal that is a function of y(t) such as the power of the received audio signal y(t).

In step S414, the comparison module 312 is operable to determine the accuracy of the estimates $\hat{s}_1(t)$ and $\hat{s}_2(t)$ and determine whether the first estimate $\hat{s}_1(t)$ achieved by using the first filter module 304 is deemed better (i.e. more accurate) than the second power estimate $\hat{s}_2(t)$ achieved by using the second filter module 308. The comparison module 312 may operate to determine the accuracy of the estimates in the time domain or in the frequency domain.

One measure for determining the accuracies of the first estimate $\hat{s}_1(t)$ and the second estimate $\hat{s}_2(t)$ is the echo return loss enhancement (ERLE) which is a measure of the amount of reduction of the echo, the ERLE is defined as:

$$ERLE_k(t) = \frac{E[y(t)]^2}{E[\hat{s}_k(t) - y(t)]^2}$$

Typically, the ERLE is measured in decibels (dB):

$$ERLE_k(t) = 10 \log \frac{E[Y(t)]^2}{E[\hat{s}_k(t) - y(t)]^2}$$

In the above equations, E[ ] is the expectation operator. The ERLE measure can, and typically is, applied to non-stationary signals. In particular, in practice the expectation values are evaluated using short-time average values:

$$ERLE_k(t) = \frac{\sum_{k=0}^{K-1} y^2(t-k)}{\sum_{k=0}^{K-1} (\hat{s}(t-k) - y(t-k))^2}$$

The ERLE measure estimates the ability of the model to produce an echo estimate that is close to the microphone signal y(t). It becomes high when there is single-talk echo (only echo signal and no near-end signal in the microphone signal y(t)) and when the model provides an accurate echo power estimate. It is a good measure for reasonable SNRs when there is loudspeaker echo in the microphone signal y(t), at least when the echo is stronger than the noise in the near-end.

When the ERLE measurement is used to determine the accuracies of the first estimate $\hat{s}_1(t)$ and the second estimate $\hat{s}_2(t)$, in step S414 the ERLE value for the first estimate $\hat{s}_1(t)$ is compared to the ERLE value for the second estimate $\hat{s}_2(t)$ to determine if the first filter module 304 is more accurate that the second filter module 308.

Model accuracy measures, other than the ERLE may be used for determining the accuracies of the echo estimates. Examples of such other model accuracy measures are the magnitude of the estimation error:

$$\Sigma_{k=0}^{K-1}(\hat{s}(t-k) - y(t-k))^2$$

weighted ERLE measures such as:

$$ERLE_k(t) = \frac{\sum_{k=0}^{K-1} w_k y^2(t-k)}{\sum_{k=0}^{K-1} w_k (\hat{s}(t-k) - y(t-k))^2}$$

and signal similarity measures such as the cross correlation between $\hat{s}(t)$ and y(t):

$$\frac{E[y(t)\hat{s}(t)]^2}{E[\hat{s}_k(t)]^2 E[y(t)]^2}$$

For the case when the echo is estimated by the first filter module 304 and the second filter module 308 in the frequency domain (frequency domain models) producing frequency domain echo estimates, and frequency domain representations $\hat{S}(t, f)$ and $Y(t, f)$ of $\hat{s}(t)$ and $y(t)$ are available, the accuracy measures may be evaluated separately at step S414 for each frequency when the measure allows such a partitioning (the model accuracy measure examples referred to above allow this).

Regardless of the model accuracy measure that is used, in step S414 a first accuracy value of the first estimate $\hat{s}_1(t)$ is determined (according to the particular model accuracy measure used) and a second accuracy value of the second estimate $\hat{s}_2(t)$ is determined (according to the particular model accuracy measure used) and these values are compared to determine if the first filter module 304 is more accurate that the second filter module 308 (i.e. whether the first accuracy value is greater than the second accuracy value).

The first accuracy value of the first estimate $\hat{s}_1(t)$ and the second accuracy value of the second estimate $\hat{s}_2(t)$ may be determined periodically. For example, accuracy values may be averaged over a predetermined number of samples of the audio signal x(t) and the received audio signal y(t) in a given time period to arrive at the respective first and second accuracy values. That is, the first and second accuracy values may be determined for each frame of the received audio signal y(t). However this is merely an example, and the respective first and second accuracy values may be determined less or more often than for each frame.

If at step S414, it is determined that the first filter module 304 is more accurate than the second filter module 308 then at step S416 the comparison module 312 outputs a signal to update the second filter module 308 based on the first filter module 304.

At step S416, the filter coefficients of the second filter module 308 are updated based on the filter coefficients of the first filter module 304.

In the case where the first filter module 304 and the second filter module 308 estimate the echo in the time domain, the update of the second filter module 308 may be implemented in the time domain whereby a copy of the time domain filter coefficients used by the first filter module 304 at a point in time are supplied to the second filter module 308 for use in generating an estimate of the echo component s(t) in the near end signal y(t).

Alternatively, in the case where the first filter module 304 and the second filter module 308 estimate the echo in the frequency domain, the update of the second filter module 308 may be implemented in the frequency domain whereby a copy of the frequency domain filter coefficients used by the first filter module 304 are supplied to the second filter module 308 for use in generating an estimate of the echo component s(t) in the near end signal y(t). As discussed above, an accuracy value of the first filter module 304 may be determined according to a model accuracy measure in the frequency domain for a plurality of frequencies, and an accuracy value of the second filter module 308 may be determined according to the model accuracy measure in the frequency domain for the plurality of frequencies. The comparison module 312 may then determine if the first filter module 304 is more accurate than the second filter module 308 at each of the plurality of frequencies based on a comparison of the first accuracy value and the second accuracy value at each of the plurality of frequencies and selectively update the second model based on these comparisons.

If it is determined that the first filter module 304 is more accurate than the second filter module 308 at one or more frequencies, a copy of frequency domain filter coefficients used by the first filter module 304 for the one or more frequencies are supplied to the second filter module 308 to update the second filter module 308. Following the update the second filter module 308 is arranged to use these frequency domain filter coefficients for generating an estimate of the echo component s(t) in the near end signal y(t) at the one or more frequencies.

Step S416 may be implemented in many ways. For example the comparison module 312 may instruct the second filter module 308 to update its filter coefficients with the filter coefficients of the first filter module 304. Alternatively, the comparison module 312 may instruct (not shown in FIG. 3) the first filter module 304 to supply its filter coefficients to the second filter module 308 so that the second filter module 308 may update its coefficients with the coefficients of the first filter module 304. Alternatively, the comparison module 312 may supply the filter coefficients of the first filter module 304 to the second filter module 308 so that the second filter module 308 may update its coefficients with the coefficients of the first filter module 304.

If at step S414, it is determined that the first filter module 304 is not more accurate than the second filter module 308 then at step S418 the comparison module 312 does not output any signal to update the coefficients of the second filter module 308 based on the first filter module 304.

Referring back to step S410, after the second estimate $\hat{s}_2(t)$ has been supplied to the echo suppression module 314 the process proceeds to step S412. In step S412 the echo suppression module 314 uses the estimate $\hat{s}_2(t)$ to apply echo suppression to the received audio signal y(t), thereby suppressing the echo in the received audio signal.

The purpose of the echo suppressor 314 is to suppress the loudspeaker echo present in the microphone signal, e.g. in a VoIP client, to a level sufficiently low for it not to be noticeable/disturbing in the presence of the near-end sounds (non-echo sounds) picked up by the microphone 212. In order to be able to choose the proper amount of echo suppression an accurate estimate of the echo or echo power is needed, and as described above this is provided by updating the second filter module 308 based on the first filter module 304 when the first filter module 304 is deemed more accurate than the second filter module 308, and using only the accurate estimate of the echo or echo power output from the second filter module 308 to apply echo suppression. The echo suppression module 314 is designed to apply signal dependent suppression that varies both over time and frequency to the received audio signal y(t). Echo suppression methods are known in the art. Furthermore, the echo suppression method applied by the echo suppression module 314 may be implemented in different ways. As such, the exact details of the echo suppression method are therefore not described in detail herein.

The echo suppression module 314 outputs the received signal, with the echo having been suppressed, for further processing at the user device 104. For example, the signal output from the echo suppression module 314 may be processed by the client 206 (e.g. encoded and packetized) and then transmitted over the network 106 to the user device 110 in a call between the users 102 and 108. Additionally or alternatively, the signal output from the echo suppression module 314 may be used for other purposes by the user device 104, e.g. the signal may be stored in the memory 214 or used as an input to an application which is executing at the user device 104.

The methods described herein are inherently robust to doubletalk. The methods described herein are not dependent on any doubletalk detection functionality for estimating when to update the second model, and the updating of the second model is not dependent on any step-size algorithm requiring the model accuracy to be known. The embodiments described above, however, may be used together with such functionalities.

Furthermore, the invention is very insensitive to buffering problems which typically can be problematic for echo cancellers. In an echo suppressor, typically an estimate of the power of the echo is produced for each frequency band and each frame. The first filter module 304 may utilise a linear model such as an FIR filter. When an FIR filter is adapted continuously the adaptation process requires that the samples of the loudspeaker signal x(t) and microphone signal y(t) are synchronized, i.e., no buffering problems and no clock-drift. When they are not synchronized, the first filter module 304 will diverge and give very inaccurate echo predictions. However, in the embodiments described above, it is acceptable if the first filter module 304 sometimes diverges, since any diverged estimates produced by the first filter module 304 will not be used to predict the echo power (the second filter module 308 is used for this). The mismatched loudspeaker signal x(t) and microphone signal y(t) will however cause an error in the predicted echo produced by the second filter module 308. The error will, however, be much smaller than if the second filter module 308 had diverged, and since typically echo powers are computed for frames, it will not be problematic when the mismatch relates to a single sample.

The first filter module 304 and the second filter module 308 may utilise any linear filter (e.g. a Finite Impulse Response (FIR) filter or an Infinite impulse Response (IIR) filter) to model the echo path of the echo in the received audio signal. As is known to persons skilled in the art, a filter may be defined by the filter type and the filter order. Preferably, the first filter module 304 and the second filter module 308 will be of the same filter type however the possibility of the first filter module 304 and the second filter module 308 being of different filter types is not excluded. When the first filter module 304 and the second filter module 308 are of the same filter type, they may also be of the same order or alternatively be of different orders, for example the second filter module 308 may have a lower order than the first filter module 304.

As described above, the first filter module 304 is continually updated regardless of the signal conditions at hand. A step-size adjustment scheme may optionally be used in relation to the first filter module 304 in the embodiments described above.

As described above, the filter coefficients for the first filter module 304 may be obtained by executing a stochastic gradient algorithm. In particular the first filter module 304 executes a stochastic gradient algorithm to identify the coefficients of the filter module 304 that minimises an error signal e(t).

Updated filter coefficients for the filter module 304 are generated in response to the error signal e(t), the input signal x(t) and the previous filter coefficients.

The stochastic gradient algorithm operates in a time recursive manner. This means it does not instantaneously adapt to changes in the system, instead the algorithm iteratively converges to an approximation of the system over a finite time interval.

The filter coefficients of the first filter module 304 filter the far end signal x(t) to generate an estimate of the echo component in the near end signal y(t). The error signal e(t) is obtained by a subtractor (not shown in FIG. 3) which subtracts the first filter module's estimate of the echo component in the near end signal y(t) from the near end signal y(t) and supplies the error signal e(t) to the first filter module 304. It will be appreciated that it is desirable for the error signal(t) to be small. For example, when there is no near end signal v(t) in the microphone signal, ideally the error signal is equal to zero.

Stochastic gradient algorithms have a convergence parameter in the form of a step-size for the update of the model parameters. This can in some applications be chosen as fixed but in many cases better performance is achieved if it is chosen in a signal-dependent manner. The step-size controls the sensitivity of the updating to the noise in the microphone signal y(t). If it is chosen to be small, the update speed is slow but is less insensitive to the noise, but if it is chosen to be large the update speed is instead rapid but more sensitive to the noise. The reference to "update speed" or "adaptation speed" used herein is used to refer to how quickly the model is able to adapt to the signal conditions at hand in the system. That is, using a smaller step-size will result in a smaller eventual error signal e(t), however convergence to an approximation of the system will be slower due the greater number of iteration steps required (slower convergence rate), and using a larger step-size will result in a larger eventual error signal e(t), however convergence to an approximation of the system will be quicker due the fewer number of iteration steps required (faster convergence rate).

In order to achieve estimates of very high accuracy the step-size needs to be small in order to avoid overshooting the true estimates due to too high step size.

In the step-size adjustment scheme, the accuracy of the estimate $\hat{s}_1(t)$ is determined according to an echo return loss enhancement measurement. This echo return loss enhancement measurement may be the same accuracy measurement made by the comparison module 312 in step S414. Alternatively this echo return loss enhancement measurement may be a separate measurement to the accuracy measurement made by the comparison module 312 when measures other than ERLE are used in step S414.

A convergence parameter selection module (not shown in FIG. 3) determines a value for a convergence parameter (step size) used in the algorithm executed in the filter module 304 based on the accuracy of the estimate $\hat{s}_1(t)$. In particular, the convergence parameter selection module selects the convergence parameter to control the adaptation speed of the filter module 304 as a non-increasing function of the echo return loss enhancement measurement.

The echo return loss enhancement measurement may be compared to a threshold value, and the convergence parameter selection module adjusts the convergence parameter based on this comparison.

Since the echo return loss enhancement measure has the property that the model accuracy is always high when the echo return loss enhancement measurement is high it may be used to slow down the adaptation speed when the echo return loss enhancement measurement is high (i.e. higher than the predetermined threshold value) in order to achieve increasingly accurate estimates, and increase the adaptation speed when the echo return loss enhancement measurement is low (i.e. lower than the predetermined threshold value) in order to quickly track changes in the model parameters.

The step-size adjustment scheme ensures that fast adaptation is achieved when the accuracy of the model is unknown (via the high updating speed when the echo return loss enhancement measurement is low), and that increasingly accurate estimates are achieved when the model is known to be accurate (via decreasing the updating speed when the echo return loss enhancement measurement is high).

In the embodiments described above, the echo removal is implemented in a VoIP system (e.g. the received audio signal may include speech of the user 102 for transmission to the user device 110 during a call between the users 102 and 108 over the communication system 100). However, the echo removal methods described herein can be applied in any suitable system in which echo removal is to be applied.

In the embodiments described above, and shown in the Figures, the echo removal module 314 implements echo suppression.

In the embodiments described above, and shown in the Figures, echo cancellation (or "echo subtraction") is not applied to the received audio signal y(t). That is, there is no echo cancellation module in the user device 104 and the echo suppression is applied to the received audio signal y(t) without a prior step of applying echo cancellation to the received audio signal y(t).

However, in other embodiments, echo cancellation may be applied, by an echo cancellation module, to the received audio signal y(t). In particular, the echo suppression applied by the echo suppression module 314 may be applied downstream of (i.e. after) the echo cancellation in the processing of the received audio signal y(t). The echo cancellation module would subtract an estimate of the echo signal from the received audio signal, but due to inaccuracies in the estimate of the echo signal, a residual echo would most-likely remain in the received audio signal. It is the residual echo that would then be suppressed by the echo suppression module 314. This echo suppression could be applied in the same way as described herein in the embodiments in which no echo cancellation is applied. If echo subtraction is used, the effect of it can be taken into account in the echo suppression.

In other embodiments, the echo removal module 314 implements echo cancellation. That is, the echo removal module 314 is arranged to subtract an estimate of the echo signal $\hat{s}_2(t)$ from the received audio signal y(t).

The methods described herein may be implemented by executing a computer program product (e.g. the client 206) at the user device 104. That is, a computer program product may be configured to remove echo in the received audio signal y(t), wherein the computer program product is embodied on a computer-readable storage medium (e.g. stored in the memory 214) and configured so as when executed on the CPU 202 to perform the operations of any of the methods described herein.

Generally, any of the functions described herein (e.g. the functional modules shown in FIG. 3 and the functional steps shown in FIG. 4) can be implemented using software, firmware, hardware (e.g., fixed logic circuitry), or a combination of these implementations. The modules and steps shown separately in FIGS. 3 and 4 may or may not be implemented as separate modules or steps. For example, the echo suppression module 314 may perform the function of the first power estimating module 306, the second power estimating module 310 and of the comparison module 312. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors. For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of removing echo, the method comprising:
   outputting an audio signal;
   receiving an audio signal, wherein the received audio signal includes echo resulting from said outputted audio signal;
   determining a first model estimate of the echo in the received audio signal using a first model based on the outputted audio signal and the received audio signal;
   determining a second model estimate of the echo in the received audio signal using a second model based on the outputted audio signal;
   determining a first accuracy value of the first model according to a model accuracy measure;
   determining a second accuracy value of the second model according to the model accuracy measure;
   determining if the first model is more accurate than the second model based on a comparison of the first accuracy value and the second accuracy value and selectively updating the second model based on said comparison; and
   using only the second model estimate of the echo to remove the echo in the received audio signal.

2. The method of claim 1, wherein the method comprises updating the second model if the first model is more accurate than the second model.

3. The method of claim 1, wherein the second model is not updated if the first model is not more accurate than the second model.

4. The method of claim 1, wherein the first accuracy value is determined based on the first model estimate and the second accuracy value is determined based on the second model estimate.

5. The method of claim 1, wherein the method further comprises:
   using the first model estimate to determine a first model estimate of the echo power of the echo in the received audio signal; and using the second model estimate to determine a second model estimate of the echo power of the echo in the received audio signal,
wherein the first accuracy value is determined based on the first model estimate of the echo power of the echo and the second accuracy value is determined based on the second model estimate of the echo power of the echo.

6. The method of claim 1, wherein the model accuracy measure is a measure based on an echo return loss enhancement measure.

7. The method of claim 1, wherein the model accuracy measure is one of: a measure of a magnitude of an estimation error: a weighted echo return loss enhancement measure; and a signal similarity measure.

8. The method of claim 1, wherein the first model executes an algorithm to determine filter coefficients and uses said filter coefficients to filter the outputted audio signal to determine the first model estimate of the echo.

9. The method of claim 8, wherein the algorithm comprises a convergence parameter and the model accuracy measure is a measure based on an echo return loss enhancement measure, the method further comprising:
updating said convergence parameter based on said first accuracy value, wherein the convergence parameter is selected as a non-increasing function of the accuracy value.

10. The method of claim 1, wherein the determining of the first model estimate of the echo using the first model and the second model estimate of the echo using the second model is implemented in the time domain and the updating of the second model is implemented in the time domain whereby a copy of time domain filter coefficients used by the first model are supplied to the second model.

11. The method of claim 1, wherein the determining of the first model estimate of the echo using the first model and the second model estimate of the echo using the second model is implemented in the frequency domain the method comprising:
determining a first accuracy value of the first model according to a model accuracy measure in the frequency domain for a plurality of frequencies;
determining a second accuracy value of the second model according to the model accuracy measure in the frequency domain for said plurality of frequencies; and
determining if the first model is more accurate than the second model at each of said frequencies based on a comparison of the first accuracy value and the second accuracy value and selectively updating the second model based on said comparison.

12. The method of claim 11, wherein if it is determined that the first model is more accurate than the second model at one or more frequencies, a copy of frequency domain filter coefficients used by the first model for the one or more frequencies are supplied to the second model.

13. The method of claim 1, wherein using only the second model estimate of the echo to remove the echo in the received audio signal comprises using only the second model estimate of the echo to apply echo suppression to the received audio signal, thereby suppressing the echo in received audio signal.

14. The method of claim 1, wherein using only the second model estimate of the echo to remove the echo in the received audio signal comprises using only the second model estimate of the echo to apply echo cancellation to the received audio signal, wherein the second model estimate of the echo is subtracted from the received audio signal.

15. The method of claim 1, wherein the method is performed at a user device for use in a communication event, and wherein the received audio signal comprises speech of a user for transmission from the user device in the communication event.

16. The method of claim 15, wherein the communication event is a voice-over-internet-protocol (VoIP) call.

17. The method of claim 16, wherein the outputted audio signal comprises far-end speech signals of the VoIP call which are included in the echo in the received audio signal.

18. A device comprising:
audio output apparatus configured to output an audio signal;
audio input apparatus configured to receive an audio signal, wherein the received audio signal includes an echo resulting from said outputted audio signal;
a modelling module configured to determine a first model estimate of the echo in the received audio signal using a first model based on the outputted audio signal and the received audio signal, determine a second model estimate of the echo in the received audio signal using a second model based on the outputted audio signal, determine a first accuracy value of the first model according to a model accuracy measure, determine a second accuracy value of the second model according to the model accuracy measure, determine if the first model is more accurate than the second model based on a comparison of the first accuracy value and the second accuracy value and selectively update the second model based on said comparison; and
an echo removal module configured to use only the second model estimate of the echo to remove the echo in the received audio signal.

19. The device of claim 18, wherein the audio output apparatus comprises a speaker configured to output the outputted audio signal, and wherein the audio input apparatus comprises a microphone configured to receive the received audio signal.

20. A method of removing echo, the method comprising:
determining a first model estimate of the echo in the received audio signal using a first model based on the outputted audio signal and the received audio signal;
determining a second model estimate of the echo in the received audio signal using a second model based on the outputted audio signal;
using the first model estimate to determine a first echo return loss enhancement measurement;
using the second model estimate to determine a second echo return loss enhancement measurement;
determining if the first model is more accurate than the second model based on a comparison of the first and second echo return loss enhancement measurements and selectively update the second model based on said comparison; and
using only the second model estimate of the echo to remove the echo in the received audio signal.

* * * * *